Fig.3.

Patented Oct. 1, 1929

1,729,683

UNITED STATES PATENT OFFICE

ARTHUR F. PYM, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY

LASTING MACHINE

Application filed June 3, 1926, Serial No. 113,419. Renewed February 21, 1929.

This invention relates to lasting machines, and more particularly, in some of its important aspects, to machines for lasting the toes of shoes.

It is well recognized that, in lasting machines provided with toe-embracing wipers, the edges of the wipers should conform as closely as possible to the contour of the portions of the shoe upon which they operate, so that they will apply effective wiping and shaping pressure to the upper materials. It is especially desirable that the upper materials be shaped closely to the edge of the insole, and also, on welt shoe work, that they should be wiped inwardly in close conformity to the rib or shoulder of the insole to which the welt is afterwards attached. The toe of a shoe, however, differs substantially in the degree of its curvature in these different locations, and it has accordingly been the practice to give the edges of the toe wipers an average curvature by shaping them to conform to a pattern corresponding to the contour of the edge of the toe end of the insole. While this has appeared to be the best practical expedient which could be adopted, it is evident that, because of the added thickness of the upper materials, wipers so shaped will not conform exactly to the contour of the shoe opposite to the edge face of the insole, nor will they conform exactly to the contour of the upper materials lying against the rib or shoulder of the insole. It will be further evident that, when such wipers are used for upwiping the toe, they will not conform accurately to the contour of different portions of the toe because of differences in curvature at different portions of the height of the toe.

The present invention aims to effect substantial improvements in toe-lasting machines by providing different wipers so shaped as to subject different portions of the toe of a shoe to the most effective treatment. For the purposes in view the machine herein shown is provided with a plurality of wipers formed and arranged respectively to upwipe the upper, to shape it to the edge of the insole, and to conform it to the rib or shoulder of the insole. For convenience of designation, the wipers for shaping the upper to the edge of the insole will be referred to as the edge wipers, and those for shaping it to the rib or shoulder of the insole will be referred to as the shoulder wipers. As herein illustrated, the upwiping wipers are provided with a facing of yieldable material, such as rubber, to render them effective in operating at different portions of the height of the toe, while the edge wipers and the shoulder wipers are shaped to conform accurately to the curvature of the portions of the upper materials opposite to the edge face of the insole and opposite to the rib or shoulder of the insole, respectively. The machine herein shown is so organized that after the upwiping wipers complete their operation on the shoe, the edge wipers shape the upper to the edge face of the insole and then wipe it inwardly from the edge over the feather of the insole, after which the shoulder wipers are forced inwardly between the edge wipers and the shoe to wipe the upper over the feather with increased pressure and to conform it to the shoulder or rib of the insole, the arrangement being such that by relative movement of the wipers and the shoe heightwise of the toe the upwiping wipers, after their operation on the shoe, are disengaged from the shoe to make way for the operation of the edge and shoulder wipers.

The invention further provides a novel organization of toe-lasting mechanism and means for supporting a shoe and for moving it relatively to the lasting mechanism in the lasting operation, the construction shown comprising a toe rest and a toggle-operated clamp member for clamping a shoe on the toe rest, together with means for moving the toe rest and clamp member as a unit to upwipe the upper and thereafter to press the shoe yieldingly against the wipers in the overwiping operation.

The above and other features of the invention, including various novel details of construction and combinations of parts, will now be described with reference to the accompanying drawings and pointed out in the claims.

In the machine herein shown the different wipers are so arranged as to have no movement heightwise of the shoe, the upwiping of the upper and the pressing of its marginal portion downwardly upon the insole being effected by control of the shoe in a manner more particularly hereinafter explained. Each pair of wipers, however, receives bodily advancing movement lengthwise of the shoe and simultaneous swinging or closing movements, and to this end the different pairs of wipers are connected to wiper carriers which are mounted in superposed relation within a casing 20 positioned at the top of a frame 22.

Figure 6:
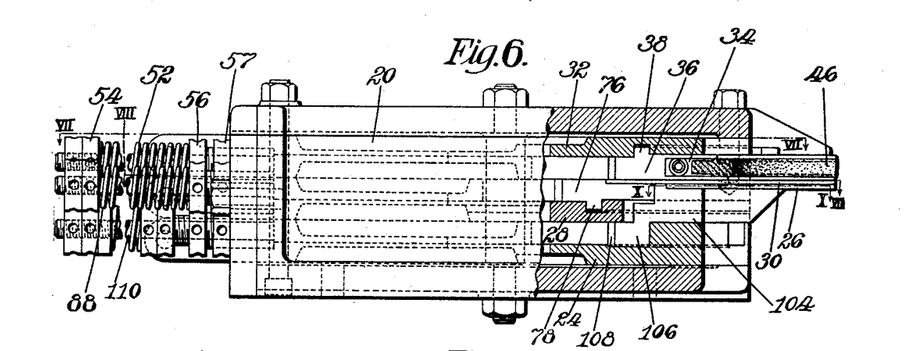
Fig. 6 is a view in side elevation of the wiper mechanism, with parts of the structure broken away.
Figure 7:
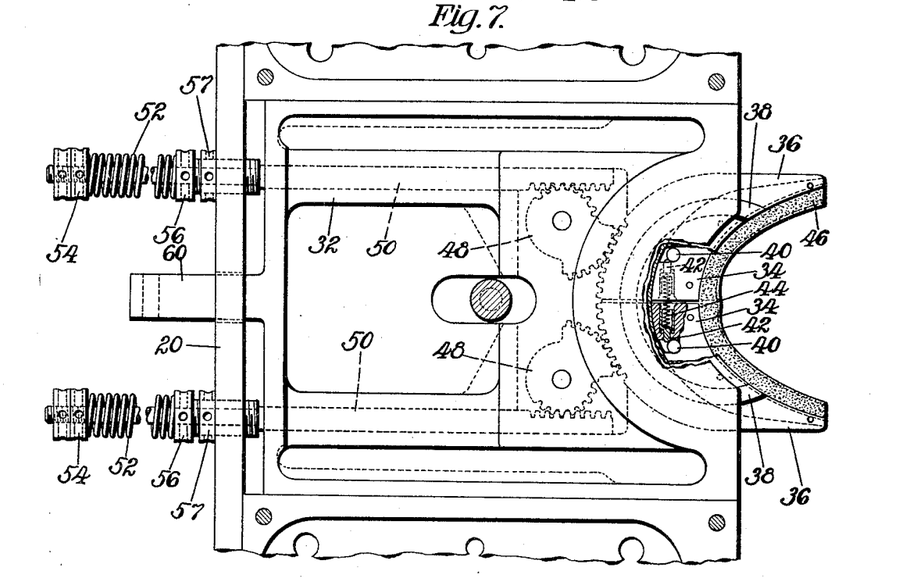
Fig. 7 is a section of the line VII—VII of Fig. 6, with parts broken away.

The lowermost wiper carrier comprises a slide 24 (Fig. 6) which supports, in a manner more particularly hereinafter explained, a pair of shoulder wipers 26. Mounted above the slide 24 is a second wiper carrier or slide 28 which supports a pair of edge wipers 30 directly above the wipers 26. Above the slide 28 is a third wiper carrier or slide 32 which serves as operating means for a pair of upwiping wipers 34. The latter consist of plates mounted within recesses formed in wiper holders 36 (Fig. 7) which are provided with arc-shaped ribs 38 guided in corresponding recesses formed in the wiper carrier 32, so that the wiper plates 34 are mounted for swinging movements about an axis located substantially at the end of the toe of the shoe. It will be seen that the wiper holders 36 are supported upon the middle or edge wiper plates 30 which are located beneath them. The wiper plates 34 are provided with recesses in their edges to receive pins 40 which are fast on the wiper holders 36, these pins serving to guide the wipers into the proper position when they are placed in the wiper holders. Spring-controlled plungers 42 are mounted in the wiper plates 34 for engagement with the pins 40 to hold the wipers detachably in place. In the construction shown a single spring 44 is provided for controlling both plungers 42, this spring being of sufficient length to hold the plungers in place during the closing movements of the wipers. The upwiping wiper plates 34 are preferably faced on their front edges with a strip 46 of yieldable friction material, such as rubber, for engagement with the shoe, this strip, as illustrated, being continuous from the outer end of one wiper to the outer end of the other wiper.

For imparting to the upwiping wipers 34 swinging or closing movements the wiper carrier 32 has pivotally mounted thereon a pair of gear sectors 48 which are provided with teeth in engagement with teeth formed on the edges of the wiper holders 36 and also with teeth in engagement with teeth formed on rack bars 50 which are slidingly movable in guideways formed in the wiper carrier 32. The rack bars 50 extend outwardly through the rear end of the casing 20 and are encircled by springs 52 mounted between nuts 54 on their outer ends and sleeve members 56 adjustably threaded in the casing 20 and provided with lock nuts 57. As the wiper carrier 32 is moved forwardly toward the shoe, the rack bars 50 are held normally stationary by the springs 52, so that the gear sectors are operated in response to the movement of the wiper carrier to impart swinging movements to the wiper holders 36 to close the wipers 34 inwardly against the sides of the toe. If the resistance to the closing movements of the wipers becomes great enough, the springs 52 may yield, thus permitting continued advancing movement of the wipers lengthwise of the shoe without further closing movements.

Figure 4:
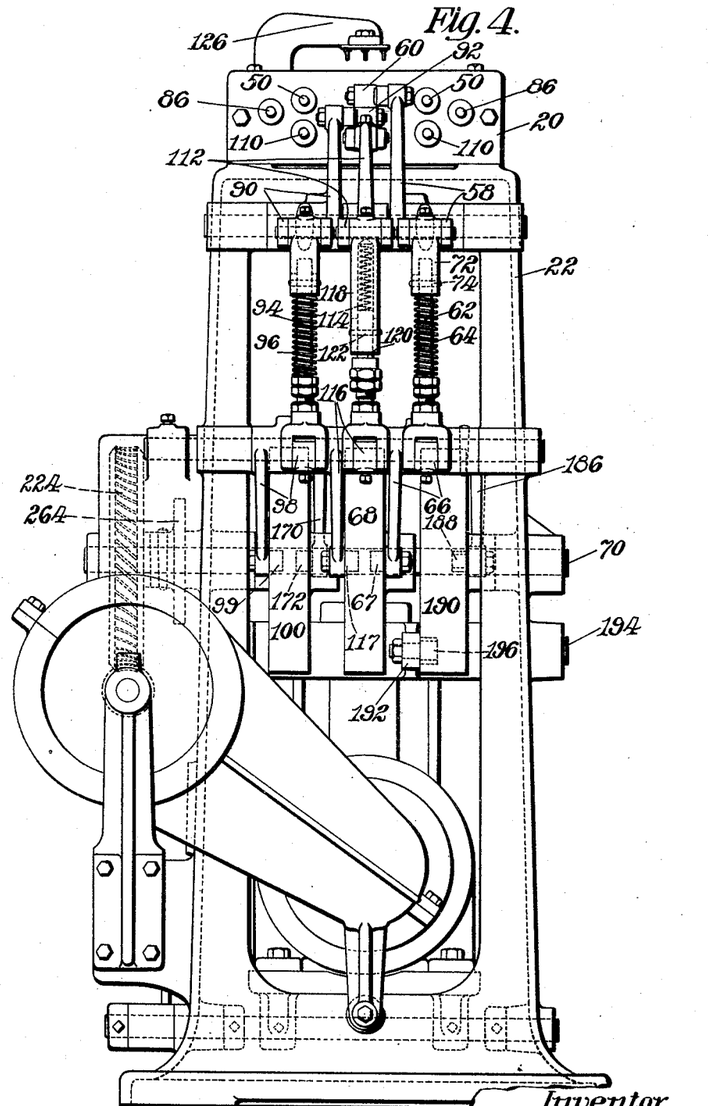
Fig. 4 is a view of the machine in rear elevation.

The advancing movement of the wiper carrier 32 is effected by means of a bell crank 58 (Figs. 2 and 4) on the frame 22, one arm of which is connected to a lug 60 projecting from the carrier through an opening in the casing 20. The other arm of the bell crank 58 is connected by a rod 62 and a spring 64 to one arm of a bell crank 66, the other arm of which carries a roll 67 operated upon by a path cam formed in one side of a cam wheel 68 fast on a cam shaft 70. The upper end of the rod 62 is slidingly mounted in a coupling member 72 which connects the rod to the bell crank 58, in order to provide for yield against the resistance of the spring 64 in the advancing movement of the wipers, there being a pin and slot connection 74 between the rod 62 and the member 72.

Figure 8:
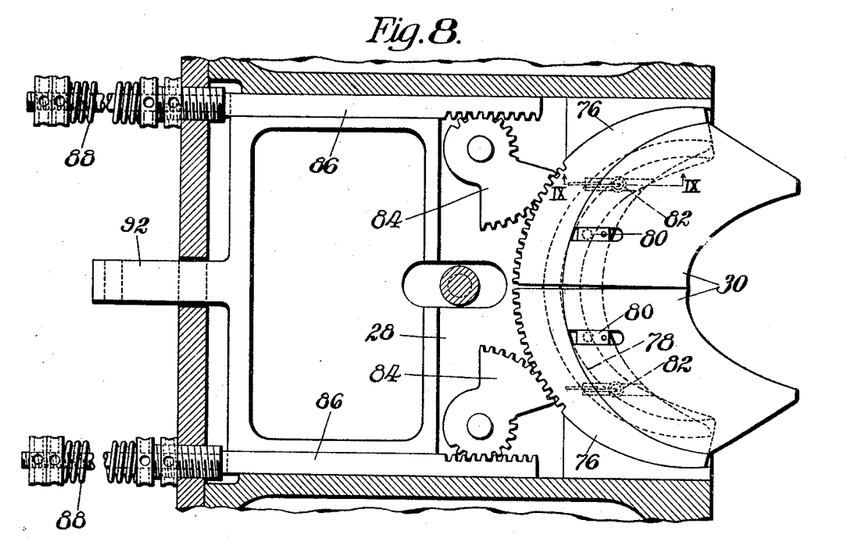
Fig. 8 is a section on the line VIII—VIII of Fig. 6.
Figure 9:
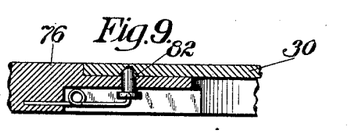
Fig. 9 is a section on the line IX—IX of Fig. 8.

The edge wipers 30 (Figs. 6 and 8) are mounted on wiper holders 76 which are supported on the middle wiper carrier 28 and are provided with arc-shaped ribs 78 guided in corresponding grooves in the carrier 28. The wipers 30 are guided into proper position on the holders 76 by means of lugs 80 on the holders which are arranged to enter slots formed in the wipers, and they are retained in proper position by means of spring-controlled plungers 82 which are mounted in the holders and enter recesses formed in the lower faces of the wipers, as illustrated in Fig. 9. For imparting closing movements to the wipers 30 in response to advancing movement of the wiper carrier 28, the wiper carrier is provided with gear sectors 84 connected to teeth formed on the holders 76 and also to teeth formed on rack bars 86 mounted in guideways in the carrier 28. The rack bars 86 are controlled by springs 88 in the same manner as the rack bars 50 associated with the upwiping wipers. Advancing movement of the wiper carrier 28 is effected by means of a bell crank 90 (Fig. 4) one arm of which is connected to a lug 92 on the wiper carrier and the other arm of which is connected yieldingly through a rod 94 and a spring 96 to one arm of a bell crank 98. The other arm of the bell crank 98 is provided with a roll 99 which is acted upon by a path cam formed in one side of a cam wheel 100 on the shaft 70. It will thus be seen that the means for imparting advancing movement yieldingly to the wiper carrier 28 is of substantially the same character as the means hereinbefore described for advancing the wiper carrier 32.

Figure 10:
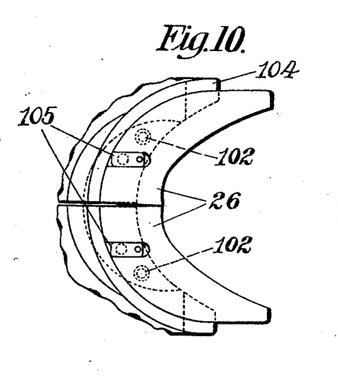
Fig. 10 is a section on the line X—X of Fig. 6.
Figure 11:
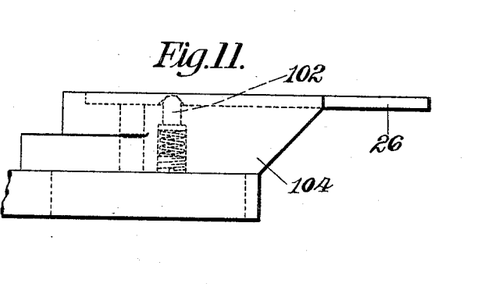
Fig. 11 is a view in side elevation of the parts shown in Fig. 10.

The shoulder wipers 26 (Figs. 6, 10 and 11) are yieldingly retained by means of spring plungers 102 upon wiper holders 104 in positions determined by lugs 105 on the holders, these wipers lying in contiguous relation to the lower faces of the wipers 30. The wiper holders 104 are positioned partly in front of the holders 76 and the carrier 28 for the wipers 30, with sufficient clearance to provide for the required movements of these parts, and at their lower ends the holders 104 are provided with curved portions 106 mounted in arc-shaped guideways formed in the wiper carrier 24, to guide the wipers 26 in their swinging movements laterally of the shoe. On their edges the curved portions 106 of the holders 104 are provided with rack teeth 108 (Fig. 6) engaged by gear sectors (not shown) on the wiper carrier 24, these gear sectors being arranged to operate in substantially the same manner as the corresponding parts hereinabove described for operating the other wipers, and for this purpose being connected to yieldingly controlled rack bars 110. The wiper carrier 24 is advanced lengthwise of the shoe by means of a bell crank 112 (Fig. 4) which is connected yieldingly through a spring 114 to another bell crank 116 provided with a roll 117 which is acted upon by a path cam formed in one side of the cam wheel 68. The spring 114 is a comparatively light spring mounted in a holder 118 extending downwardly from the bell crank 112, and is engaged at its lower end by a rod 120 connected to the bell crank 116. The rod 120 carries a pin 122 projecting through slots in the sides of the holder 118 to limit the relative movement between the rod and the holder in the operation of the wipers, so that at the end of the overwiping operation the wipers 26 will apply forward pressure positively to the upper materials.

The upwiping wipers 34, including the yieldable facing 46, are shaped to conform substantially to the peripheral curvature of the end and side faces of the toe of the size and style of shoe upon which the machine is to operate, the facing 46 being provided in order to maintain effective wiping engagement with the upper notwithstanding such small variations in the contour of the shoe as may be encountered in the progressive upwiping of the upper heightwise of the toe. The edge wipers 30 are shaped to conform accurately to the contour of the upper materials lying against or opposite to the edge face of the insole, so that they act throughout the length of their wiping edges to apply effective pressure to the upper in wiping it up and in over the edge of the insole. The shoulder wipers 26 are shaped to conform to the contour of the marginal portion of the upper materials when pressed closely against the welt-attaching shoulder or rib of the insole, so that they act throughout the length of their wiping edges to press the upper closely against the shoulder or rib and thus to form a good angle to receive the toe binder wire. The manner in which the different wipers operate in time relation to one another will be more particularly hereinafter explained.

The means for positioning the shoe in proper relation to the wipers and for moving it relatively to the wipers comprises a shoe support including as a part thereof a toe rest 124, together with a clamp member or arm 126 by which the forepart of the shoe is clamped upon the toe rest, the arm 126 in the construction shown being provided with a plurality of pins 128 adapted to project through holes in the insole into holes provided in the bottom of the last to position the shoe in the proper lengthwise, lateral and angular relation to the wipers and also to determine the proper position of the bottom of the shoe relatively to the wipers, in accordance with the method disclosed and claimed in Letters Patent No. 1,674,060, granted upon my application on June 19, 1928. A construction including such pins constitutes a very effective means of insuring the proper relation of the shoe to the wipers, although the invention is not dependent upon the use of this particular means.

The toe rest 124 is mounted upon the upper end of a rod 130 which is vertically movable in a bearing 132 on the frame of the machine and extends downwardly into a bearing formed in a vertically movable casing 134 which serves as a part of the shoe support. The casing 134 is secured at its lower end to a downwardly extending rod 136 which is controlled in a manner hereinafter explained. The lower end portion of the rod 130 within the casing 134 is enlarged and is provided with a recess to serve as a housing for a spring 138 which bears at its lower end against the upper end portion of the rod 136 and thus yieldingly permits downward movement of the toe rest relatively to the casing 134. Such downward movement of the toe rest against the resistance of the spring 138 occurs in response to downward shoe-clamping movement of the arm 126, so as to allow for differences in the height of the toes of different shoes the bottoms of which are positively positioned in the same plane by the clamping movement of the arm 126.

The arm 126 is fast on the upper end of a vertically movable rod 140 which is slidingly mounted in a bearing formed in a bracket 142 on the frame of the machine. This rod is prevented from turning, so that the pins 128 are maintained in the proper relation to the toe rest, by means of a short rod 144 slidable in a bearing formed in a lug on the bracket 142 and secured at its lower end to a bracket 146 which is clamped to the rod 140. The intermediate portion of the rod 140 is reduced in diameter and is slidable in a bearing formed in a projection 148 on the movable casing 134. The lower end portion of the rod 140 is still further reduced in diameter and is slidable in a bearing formed in a bracket 150 on the frame of the machine. Vertical movement of the rod 140 relatively to the casing 134 is effected by means of a toggle comprising a pair of links 152, 154, of which the former is fast on a rock shaft 156 on the bracket 148 and the latter is pivotally connected to a sleeve member 158 adjustably confined between nuts 160 and 162 on the rod 140, the links 152 and 154 being connected together by means of a pivot stud 164. Secured to the rock shaft 156 is a crank arm 166 which is connected by a link 168 to an arm 170 pivoted at its upper end upon the frame 22 and provided at its lower end with a roll 172 engaged by a path cam formed in one side of the cam wheel 100. By this mechanism the arm 126 is moved downwardly to clamp the shoe upon the toe rest 124, the arrangement being such that the toggle 152, 154 is substantially straightened in the shoe-clamping movement of the arm, so that at the end of this movement the arm 126 is maintained in fixed relation to the casing 134 to permit the arm and the casing, together with the toe rest, to be moved vertically as a unit, as hereinafter explained. The limit of downward movement of the arm 126 relatively to the casing 134 may be varied, in order to permit accurate predetermination of the position of the shoe, by manipulating the nuts 160 and 162 to adjust the rod 140 relatively to the member 158 to which the toggle is connected.

After the toe rest 124 has been depressed, as above explained, it is desirable to lock it against further downward movement relatively to the casing 134 in order to support the shoe firmly against downward pressure of the wipers. For this purpose the lower enlarged end portion of the rod 130 is provided on one side with downwardly facing ratchet teeth 174 arranged to be engaged by a plurality of pawls 176 which are carried by the casing 134 and are so disposed that one, at least, of them will be effective to lock the rod 130 against further depression relatively to the casing in any position to which the rod is moved. The pawls are controlled by a bell-crank 178 and by springs 180 in a manner which will be readily understood, as more fully shown and described, for example, in Letters Patent No. 1,693,119, granted upon my application on November 27, 1928. The bell crank 178 is connected by a link 182 to a lever arm 184, and connected to this arm is a depending lever cam 186 provided with a roll 188 engaged by a path cam formed in one side of a cam wheel 190 on the shaft 70. The locking of the toe rest preferably takes place shortly prior to the end of the straightening movement of the toggle 152, 154, so that the shoe will be firmly clamped upon the toe rest by the action of the toggle. It will be seen that the pawl-controlling mechanism, including the link 182, and the toggle-controlling mechanism including the link 168, are such as to permit vertical movements of the casing 134 and the parts connected therewith when such movements are effected in the manner hereinafter explained.

Figure 5:
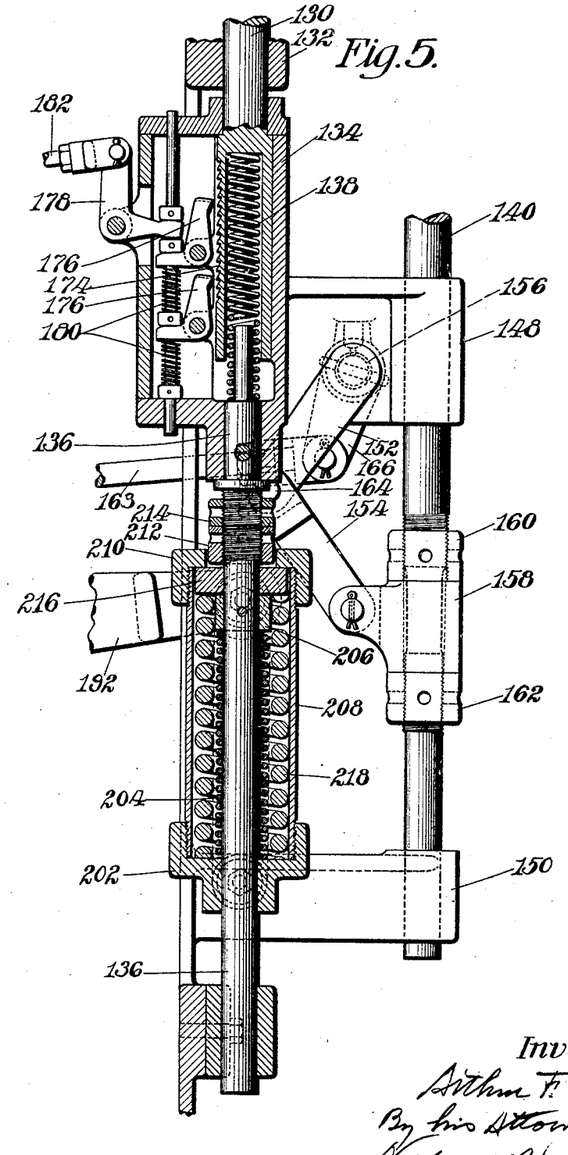
Fig. 5 is an enlarged detail view, partly in left-hand side elevation and partly in section, showing a portion of the mechanism shown in Fig. 2 for clamping and supporting the shoe and for moving it relatively to the wipers.

For effecting and controlling vertical movements of the above-described shoe-supporting and clamping mechanism, there is provided a lever 192 mounted for swinging movement about a cross rod 194. One arm of the lever 192 is provided with a roll 196 engaged by a path cam 198 formed in one side of the cam wheel 190. The other arm of the lever 192 is forked so as to extend forwardly on opposite sides of the rod 136 and is connected by links 200 to a member 202 which is slidingly mounted on the rod 136. The member 202 normally supports the rod 136, together with the various other parts of the shoe-supporting and clamping mechanism connected therewith, through a spring 204 (Fig. 5) which bears at its upper end upon a collar 206 secured to the rod 136. Threaded in the member 202 is a cylindrical sleeve member 208, and threaded upon the upper end of this member is a cap 210 provided with an opening sufficiently large to receive a nut 212 which is adjustable on the rod 136 and is held in adjusted position by a lock nut 214. Loosely mounted on the rod 136 between the collar 206 and the nut 212 is a washer 216 which may move vertically between the collar and the nut a distance which is variable in accordance with the adjustment of the nut. As the parts are positioned in Fig. 5, the washer 216 rests upon the collar 206 and is engaged on its upper face by the cap 210. It will be evident that, with the parts thus positioned, downward movement of the member 202 in response to the action of the lever 192 will result in positive downward movement of the rod 136 and the shoe holding parts connected therewith including the toe rest 124 and the clamping arm 126. Upward movement of the member 202, on the other hand, will result in yieldably effected upward movement of the rod 136 and connected parts, with more or less compression of the spring 204 in response to resistance encountered in the upward pressure of the shoe against the wipers. It is desirable at the end of the overwiping operation to force the shoe upwardly against the wipers with a considerable increase of pressure, and for this purpose there is provided a stronger spring 218 positioned between the member 202 and the washer 216, the parts being so arranged that this spring becomes effective only after sufficient yield of the spring 204, in the upward movement of the member 202, for the washer 216 to be forced upwardly against the nut 212.

For operating and controlling the cam shaft 70 any suitable mechanism may be utilized. In the construction shown there is provided a worm 220 mounted on a power shaft 222 and engaging a spiral gear wheel 224 on the shaft 70. Mounted to turn about the shaft 222 is a sprocket wheel 226 which is driven continuously by a chain 228 from an electric motor 230, this sprocket wheel having fast thereon a belt pulley 232 so that a different source of power may be utilized if desired. The sprocket wheel 226 is recessed in one side to serve as one element of a cone clutch, and coupled to the worm 220 is a co-operating clutch member 234 which turns with the worm but is slidable relatively thereto along the shaft 222. On one side the clutch member 234 is shaped for engagement with a brake member 236 which is fast on the frame of the machine. The hub of the clutch member 234 is connected to the yoke-shaped upper end of a lever arm 238 which is pivoted on the frame and has extending downwardly therefrom an arm 240 connected to a spring 242 which tends to move the clutch member 234 into engagement with the driving member or sprocket wheel 226.

Figure 3:
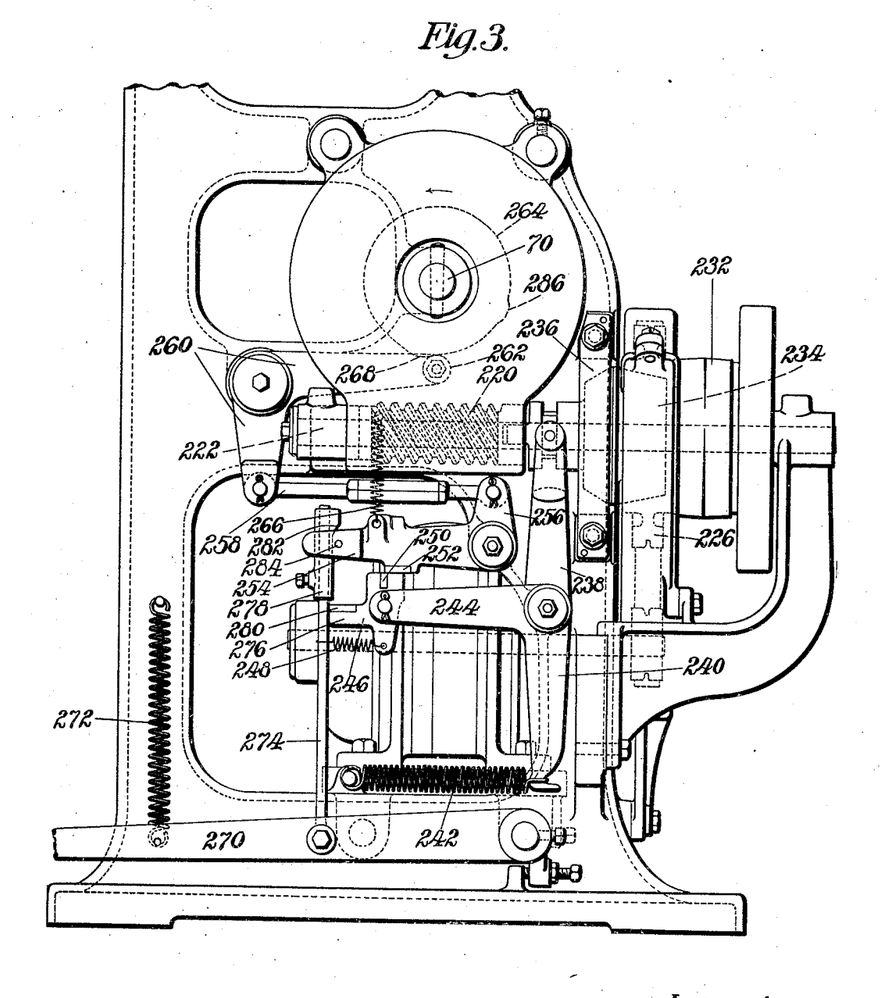
Fig. 3 shows the lower portion of the machine in right-hand side elevation, on an enlarged scale.

Mounted in fixed relation to the arms 238 and 240 is a laterally extending arm 244 on the outer end of which is pivotally mounted a block 246. Connected to the block 246 is a spring 248 which holds the block normally in the position illustrated in Fig. 3, the block being arranged to engage a shoulder on the arm 244 to limit its turning movement under the influence of the spring. The block 246 has thereon a plate 250 which is arranged to engage a plate 252 on an arm 254 mounted for swinging movement in a vertical plane above the arm 244. Integral with the arm 254 is an upwardly extending arm 256 connected by a link 258 to a bell crank 260 which is provided with a roll 262 in engagement with a cam disk 264 fast on the shaft 70. Connected to the arm 254 is a spring 266 which tends to lift the arm and thereby keeps the roll 262 in engagement with the cam disk. In the stopping position of the machine the roll 262 is depressed by a projection 268 on the cam disk 264, so that the arm 254 is swung downwardly, and by the engagement of the plate 252 with the upper end face of the plate 250 the arm 244 also is swung downwardly far enough to disconnect the clutch member 234 from the driving member 226 and to carry the member 234 into engagement with the brake 236.

For starting the machine there is provided a treadle 270 which is moved downwardly against the resistance of a spring 272 and connected to which there is an upwardly extending rod 274 normally held by the spring 248 in engagement with a lug 276 on the block 246. Fast on the upper end portion of the rod 274 is a sleeve 278 the lower end of which is arranged to engage a plate 280 on the lug 276 when the treadle 270 is depressed, and thus to turn the block 246 far enough to swing the plate 250 from under the plate 252. In this way the arm 244 is released so as to render the spring 242 effective to connect the clutch member 234 to its driving member. In further downward movement of the treadle a wedge face 282 on the sleeve member 278 engages a pin 284 on the arm 254, as a result of which the rod 274 is swung to the left (Fig. 3) far enough to release the block 246 from control of the treadle. When the machine is started the cam projection 268 moves away from the roll 262, whereupon the spring 266 acts to lift the arm 254 far enough to permit the plate 250 on the block 246 again to be moved into position under the plate 252. Even, therefore, if the operator continues to hold the treadle depressed, the machine will be stopped automatically when a cam projection on the disk 264 arrives in position to depress the roll 262. In the construction shown the disk 264 is provided with a cam projection 286 in addition to the projection 268, for bringing the machine to a stop before it completes its cycle, as more particularly hereinafter explained.

In the use of the machine the operator presents the shoe by mounting it upon the pins 128 and then depresses the starting treadle. While the lever 192 holds the rod 136 and the casing 134 stationary, the toggle 152, 154 is straightened and the clamping arm 126 is thereby moved downwardly with the shoe to press the forepart of the shoe upon the toe rest 124, the latter being moved downwardly more or less against the resistance of the spring 138 to accommodate itself to the position of the shoe determined by the arm 126. Shortly before the end of this clamping movement of the arm 126 the pawls 176 are released to cause them to engage the ratchet teeth 174 and thereby lock the toe rest against further downward movement relatively to the casing 134. As the straightening of the toggle is completed, the shoe is clamped upon the toe rest with increased pressure.

Figure 12:
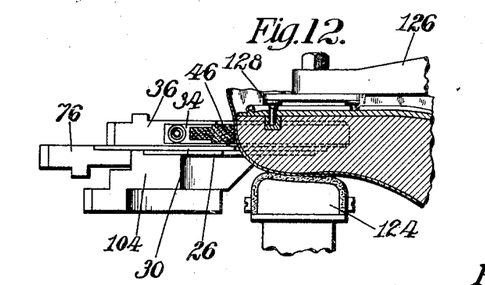
Figs. 12, 13, 14 and 15 are views illustrating different successive positions of the wipers and the shoe in the operation of the machine.
Figure 13:
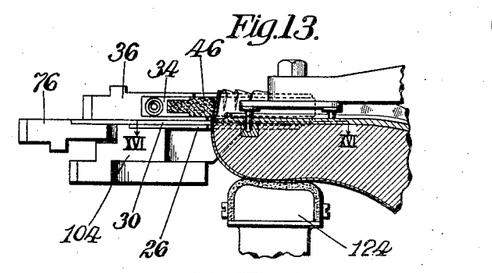

The position of the shoe after it has been thus clamped upon the toe rest is indicated by Fig. 12. At this point in the operation the upwiping wipers 34 with their yieldable facing 46 are advanced and closed about the toe below the edge of the insole, as also illustrated in Fig. 12. The cam 198 then begins to act upon the lever 192 to move the rod 136, the toe rest and the clamping arm 126 downwardly as a unit without altering the relation between the clamping arm and the toe rest. In this manner the upwiping of the upper about the toe is effected by the action of the wipers 34. By the time when the shoe arrives in the position indicated in Fig. 13, the upwiping action of the wipers 34 is completed and the edge wipers 30 are advanced and closed against the upper substantially opposite to the edge of the insole, so that in further depression of the shoe these wipers act to upwipe for a short distance across the edge of the insole, being shaped to conform accurately to the contour of the toe in this location.

Figure 1:
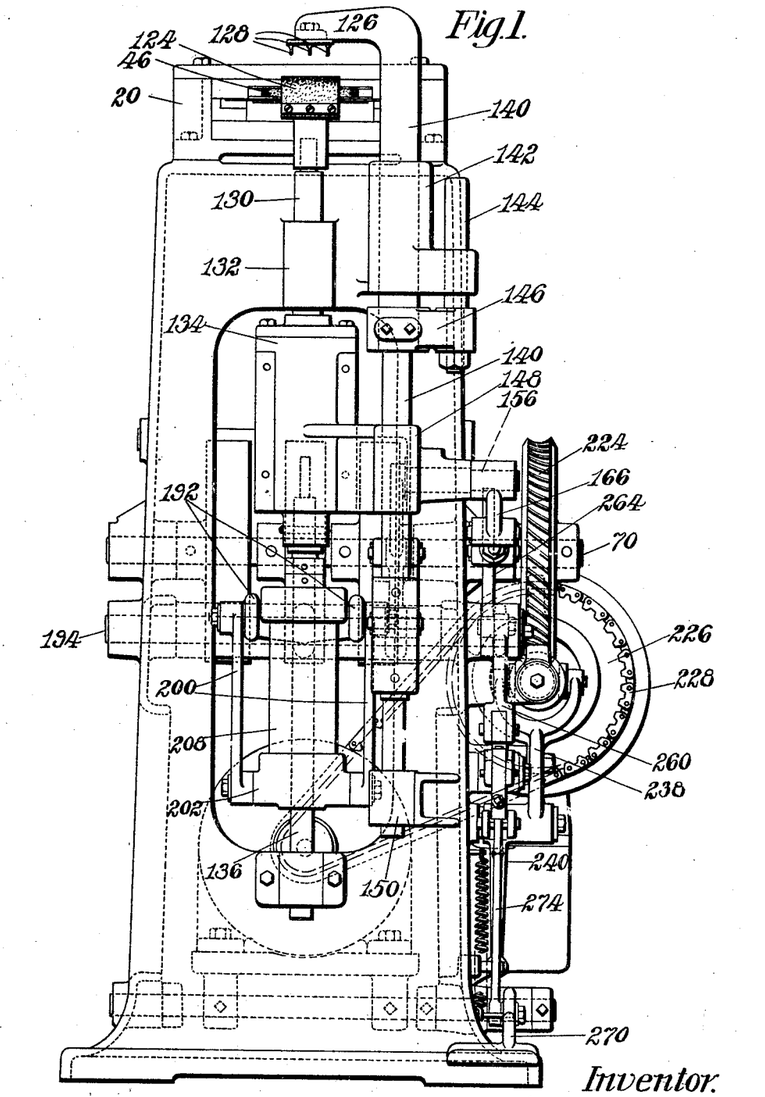
Fig. 1 is a view in front elevation of a machine in which the invention is embodied.
Figure 2:
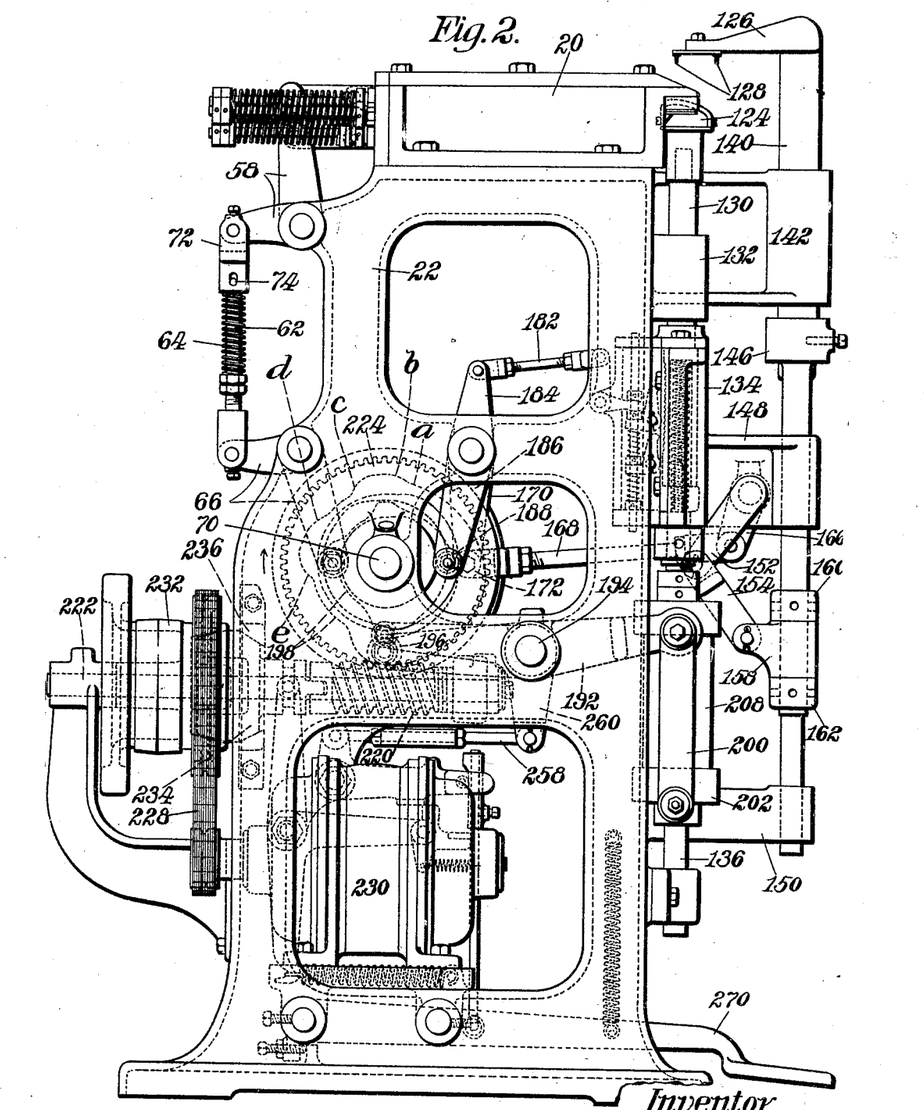
Fig. 2 shows the machine in left-hand side elevation.
Figure 14:
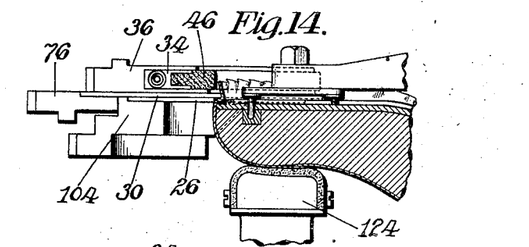
Figure 15:
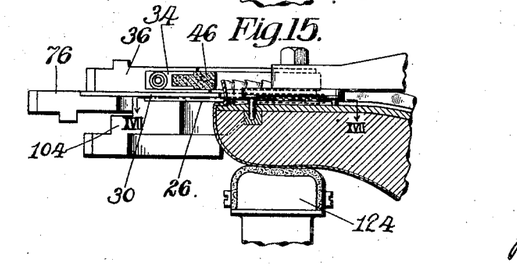
Figure 16:
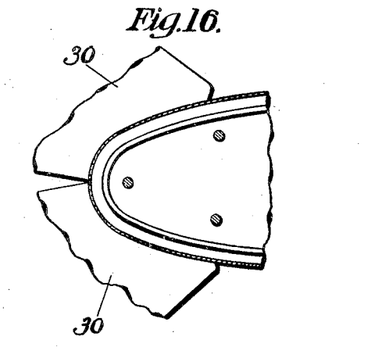
Fig. 16 is a section on the line XVI—XVI of Fig. 13.
Figure 17:
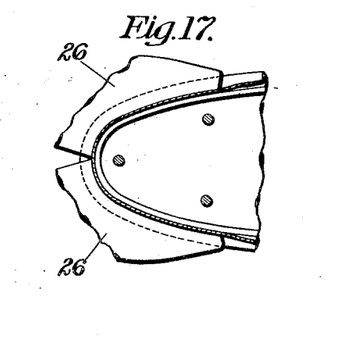
Fig. 17 is a section on the line XVII—XVII of Fig. 15.

Substantially at the point of the cycle indicated at $a$ on the cam 198 in Fig. 2, the edge wipers 30, in their further advancing and closing movements, begin to wipe the upper inwardly over the feather of the insole, and in this inward movement of the wipers 30 the cam 198 acts at the point $b$ to reverse the movement of the lever 192 and thereby to lift the member 202, so that the latter acts yieldingly through the comparatively light spring 204 to force the rod 136 and the shoe holding parts carried thereby upwardly and thus to increase the downward pressure of the wipers upon the upper. The inward movement of the wipers 30 continues substantially or nearly as far as permitted by the rib of the insole, and near the end of their inward movement the cam 198 acts at $c$ to relieve the upward pressure of the shoe against the wipers, as illustrated in Fig. 14. The shoulder wipers 26 are then advanced and closed to wedge themselves inwardly between the wipers 30 and the shoe materials over the feather of the insole. In response to the wedging action of these wipers the shoe with its holding means may be forced downwardly to a small extent against the resistance of the spring 204, thus bringing the nut 212 on the rod 136 nearer to the washer 216. The advancing and closing movement of the wipers 26 continues until the edges of these wipers press the upper materials closely against the rib of the insole, as illustrated in Fig. 15, these wipers being shaped to conform accurately to the contour of the upper materials when thus pressed closely against the rib. Substantially at the end of the inward movement of the wipers 26 the cam 198 acts at $d$ to carry the member 202 upwardly again, as a result of which the washer 216 is carried into engagement with the nut 212 so that the heavier spring 218 becomes effective to force the shoe upwardly against the wipers 26 with hard pressure.

After the upper materials have been wiped inwardly in conformity to the rib of the insole and have been pressed firmly down upon the feather of the insole by the wipers 26, the cam 198 acts at $e$ to relieve the upward pressure of the shoe against the wipers, and immediately thereafter the machine is brought to a stop by the action of the stop cam 286, in the manner hereinbefore explained. While the machine is at rest the operator is enabled to draw a binder wire inwardly about the toe under the wipers 26 and to fasten it to the shoe in the customary manner. The operator then starts the machine again by depressing the starting treadle, whereupon the various parts of the machine are returned to starting positions and the shoe is released. At the end of the cycle the machine is brought automatically to a stop by the cam 268.

It will be understood that for the best results in the use of the machine different sets of wipers will be substituted for different sizes and styles of shoes, and it is for this purpose that the wipers are made readily detachable, as hereinbefore explained. Because, however, of the provision of the yieldable facing 46 on the upwiping wipers, it is contemplated that the same upwiping wipers may be used for a plurality of different sizes or styles where the differences in contour of the toes are not very pronounced.

Having described the invention, what I claim as new and desire to secure by Letters Patent of the United States is:—

1. In a machine of the class described, toe-lasting means comprising a plurality of wipers formed and arranged respectively to upwipe the upper, to shape the upper to the edge of the insole, and to shape the marginal portion of the upper to the rib or shoulder of the insole.

2. In a machine of the class described, the combination of means for upwiping the toe of an upper, wipers shaped to conform to the contour of the upper opposite to the edge face of the insole for operating upon the upper at the edge of the insole, and wipers shaped to conform to the contour of the upper opposite to the rib or shoulder of the insole for wiping the upper inwardly against said rib or shoulder.

3. In a machine of the class described, toe-lasting means comprising an upwiping device provided with a facing of yieldable material for engagement with the shoe, edge wipers shaped to conform rigidly to the contour of the upper oppposite to the edge face of the insole, and shoulder wipers shaped to conform rigidly to the contour of the upper opposite to the rib or shoulder of the insole.

4. In a machine of the class described, toe-lasting means comprising upwiping wipers, edge wipers and shoulder wipers, and mechanism for effecting relative movement between said wipers and a shoe to cause the different wipers to operate in succession upon the shoe materials.

5. In a machine of the class described, toe-lasting means comprising upwiping wipers, edge wipers and shoulder wipers, and operating means for effecting relative movement of said wipers and a shoe heightwise of the shoe and for advancing and closing the different wipers to cause the upwiping wipers to upwipe the upper, the edge wipers to wipe the upper up across the edge and inwardly over the feather of the insole, and the shoulder wipers to wipe the upper inwardly against the rib or shoulder of the insole.

6. In a machine of the class described, toe-lasting means comprising an upwiping device, edge wipers and shoulder wipers, means for effecting relative movement of said toe-lasting means and a shoe heightwise of the shoe to cause the upwiping device to upwipe the upper and then to become disengaged from the upper, and means to cause the edge wipers and the shoulder wipers to wipe the upper over the edge and inwardly against the rib or shoulder of the insole respectively after the operation of the upwiping device on the shoe.

7. In a machine of the class described, an upwiping device arranged to embrace the toe of a shoe, means for effective relative movement of said upwiping device and a shoe heightwise of the shoe to upwipe the upper and for continuing said movement until the upwiping device becomes disengaged from the shoe, edge wipers arranged to act on the shoe after the upwiping device in the course of said relative movement to wipe the upper across the edge of the insole, and shoulder wipers arranged to operate after the edge wipers to wipe the upper inwardly against the rib or shoulder of the insole.

8. In a machine of the class described, toe-lasting means comprising an upwiping device, edge wipers and shoulder wipers, means for effecting relative movement of said toe-lasting means and a shoe heightwise of the shoe to cause the upwiping device to upwipe the upper and then to become disengaged from the upper, means for closing the edge wipers about the toe in time to cause them to wipe the upper across the edge of the insole in the course of said relative movement and for thereafter moving them inwardly over the feather of the insole, and means for moving the shoulder wipers inwardly after the edge wipers to wipe the upper against the rib or shoulder of the insole.

9. In a machine of the class described, toe-lasting means comprising an upwiping device, edge wipers and shoulder wipers, means for effecting relative movement of said toe-lasting means and a shoe heightwise of the shoe to cause the upwiping device to upwipe the upper and for continuing said relative movement until the edge wipers are in position to wipe the upper inwardly over the feather of the insole, means for closing the edge wipers inwardly against the upper on the edge face of the insole in the latter portion of said relative movement to cause them to wipe the upper across said edge and for thereafter further closing them to wipe the upper over the feather of the insole, and means for wedging the shoulder wipers inwardly between the edge wipers and the shoe to complete the overwiping of the upper and to press it against the rib or shoulder of the insole.

10. In a machine of the class described, toe-lasting means comprising an upwiping device, edge wipers and shoulder wipers, means for effecting relative movement of said toe-lasting means and a shoe heightwise of the shoe to cause the upwiping device to upwipe the upper and then to become disengaged from the upper, means for closing the edge wipers about the toe in time to cause them to wipe the upper across the edge of the insole in the course of said relative movement and for thereafter moving them over the feather of the insole, means for moving the shoulder wipers inwardly after the edge wipers to wipe the upper against the rib or shoulder of the insole, and automatic means for increasing the pressure of the edge wipers upon the feather of the insole as said wipers are moved inwardly and for thereafter relaxing the pressure to permit the shoulder wipers to be forced inwardly between the edge wipers and the shoe.

11. In a machine of the class described, toe-lasting means comprising an upwiping device, edge wipers and shoulder wipers, automatic means for moving a shoe relatively to said toe-lasting means to force the shoe through and beyond said upwiping device, means for closing the edge wipers about the toe to cause them to wipe the upper across the edge of the insole as the shoe is thus moved and for thereafter operating them to wipe the upper inwardly over the feather of the insole, and means for operating the shoulder wipers after the edge wipers to wipe the upper inwardly with increased pressure and to force it against the rib or shoulder of the insole.

12. In a machine of the class described, toe-lasting means comprising an upwiping device, edge wipers and shoulder wipers, automatic means for moving a shoe relatively to said toe-lasting means to force the shoe through and beyond said upwiping device, means for closing the edge wipers about the toe to cause them to wipe the upper across the edge of the insole as the shoe is thus moved and for thereafter operating them to wipe the upper inwardly over the feather of the insole, means for operating the shoulder wipers after the edge wipers to wipe the upper inwardly and to force it against the rib or shoulder of the insole, and means for moving the shoe reversely toward the overwiping faces of the edge wipers and the shoulder wipers as said different wipers are moved inwardly over the insole to increase the pressure of the wipers upon the shoe and for relaxing the pressure between the operations of the different wipers on the shoe.

13. In a machine of the class described, toe-lasting means comprising an upwiping device, edge wipers shaped to conform to the contour of the upper opposite to the edge face of the insole, shoulder wipers shaped to conform to the contour of the upper opposite to the rib or shoulder of the insole, means for effecting relative movement of said toe-lasting means and a shoe to cause the upwiping device to upwipe the upper, and means for operating first the edge wipers and thereafter the shoulder wipers to wipe the upper inwardly over the feather of the insole.

14. In a machine of the class described, an upwiping device arranged to embrace the toe of a shoe, means for effecting relative movement of said upwiping device and a shoe heightwise of the shoe to upwipe the upper and to cause said device then to become disengaged from the upper, edge wipers and shoulder wipers positioned to act on the shoe after said upwiping device and shaped to conform to the contour of the upper opposite to the edge face and the rib or shoulder of the insole respectively, means for operating the edge wipers to wipe the upper inwardly over the feather of the insole, and means for thereafter operating the shoulder wipers to wipe the upper inwardly with increased pressure and to force it against the rib or shoulder of the insole.

15. In a machine of the class described, toe-lasting means comprising an upwiping device, edge wipers and shoulder wipers arranged in superposed relation, means for forcing a shoe through and beyond said upwiping device into position for the edge wipers to be closed inwardly over the feather of the insole, and means for operating said edge wipers to wipe the upper inwardly and for thereafter operating the shoulder wipers to wipe the upper inwardly with increased pressure and to shape it against the rib or shoulder of the insole.

16. In a machine of the class described, toe-lasting means comprising upwiping wipers, edge wipers and shoulder wipers, separate power-operated mechanisms for operating the different respective wipers in time relation to one another, and mechanism for moving a shoe relatively to the wipers in time relation to their operative movements.

17. In a machine of the class described, an upwiping device for embracing the toe of a shoe, means for effecting relative movement of said upwiping device and a shoe heightwise of the shoe to upwipe the upper and for continuing said relative movement until said device becomes disengaged from the shoe, and wipers arranged to operate upon the shoe after said upwiping device to wipe the upper inwardly over the insole, said wipers being shaped to conform to the contour of the upper opposite to the edge face of the insole.

18. In a machine of the class described, an upwiping device for embracing the toe of a shoe, means for effecting relative movement of said upwiping device and a shoe heightwise of the shoe to upwipe the upper and for continuing said relative movement until said device becomes disengaged from the shoe, wipers adjacent to said upwiping device having wiping edges shaped to conform to the contour of the upper opposite to the edge face of the insole, and automatic means for closing said wipers to cause them to wipe the upper across the edge of the insole in the latter part of said relative movement and thereafter to wipe the upper inwardly over the bottom of the insole.

19. In a machine of the class described, an upwiping device comprising members mounted for swinging movements to close about the toe of a shoe and having a facing of yieldable material for embracing the toe, means for effecting relative movement of said upwiping device and a shoe heightwise of the shoe to upwipe the upper and for continuing said relative movement until said device becomes disengaged from the shoe, and wipers arranged to operate upon the shoe after said upwiping device to wipe the upper inwardly over the insole.

20. In a machine of the class described, an upwiping device for embracing the toe of a shoe, means for effecting relative movement of said upwiping device and a shoe heightwise of the shoe to upwipe the upper and for continuing said relative movement until said device becomes disengaged from the shoe, and wipers having wiping edges shaped to conform to the contour of the upper opposite to the rib or shoulder of the insole and arranged to wipe the upper inwardly over the feather of the insole after the upwiping of the upper.

21. In a machine of the class described, toe-lasting means comprising different wipers differently shaped to conform substantially throughout the lengths of their wiping edges to the contour of the toe of a shoe at different portions of the height of the toe respectively.

22. In a machine of the class described, toe-lasting means comprising different pairs of toe-embracing wipers differently shaped to conform respectively to the contour of the toe of a shoe all around the toe in different planes parallel to the plane of the toe end of the insole.

23. In a machine of the class described, toe-lasting means comprising different toe-embracing wipers differently shaped to conform to the contour of the toe of a shoe at different portions of the height of the toe respectively, and automatic means for operating said wipers in time relation to each other.

24. In a machine of the class described, toe-lasting means comprising different wipers shaped to conform respectively to the contour of the upper opposite to the edge face of the insole and to the contour of that portion of the upper lying against the rib or shoulder of the insole.

25. In a machine of the class described, toe-lasting means comprising edge wipers and shoulder wipers shaped to conform respectively to the contour of the upper opposite to the edge face of the insole and to the contour of that portion of the upper lying against the rib or shoulder of the insole, means for operating the edge wipers to wipe the upper inwardly at the edge of the insole, and means for operating the shoulder wipers to wipe the upper inwardly against the rib or shoulder of the insole.

26. In a machine of the class described, toe-lasting means comprising edge wipers and shoulder wipers shaped to conform respectively to the contour of the upper opposite to the edge face of the insole and to the contour of that portion of the upper lying against the rib or shoulder of the insole, means for effecting relative movement of the shoe and said edge wipers to shape the upper to the edge face of the insole and to wipe it inwardly from said face, and means for wedging the shoulder wipers inwardly between the edge wipers and the shoe to wipe the upper inwardly with increased pressure and to shape it to the rib or shoulder of the insole.

27. In a machine of the class described, toe-lasting means comprising edge wipers and shoulder wipers shaped to conform respectively to the contour of the upper opposite to the edge face of the insole and to the contour of that portion of the upper lying against the rib or shoulder of the insole, means for operating the edge wipers and the shoulder wipers in succession to wipe the upper inwardly over the feather of the insole, and automatic means for yieldingly effecting relative movement of the different wipers and the shoe heightwise of the shoe in time relation to the wiping movements of the wipers to increase the pressure of the wipers on the upper.

28. In a machine of the class described, toe-lasting means comprising edge wipers and shoulder wipers shaped to conform respectively to the contour of the upper opposite to the edge face of the insole and to the contour of that portion of the upper lying against the rib or shoulder of the insole, means for operating the edge wipers and the shoulder wipers in succession to wipe the upper inwardly over the feather of the insole, spring means for increasing the pressure of the edge wipers on the upper in a direction toward the feather of the insole in the operative movement of said wipers, and means comprising a stronger spring to cause the shoulder wipers in their operative movement to subject the upper to increased pressure toward the feather of the insole.

29. In a machine of the class described, toe-lasting means comprising edge wipers and shoulder wipers shaped to conform respectively to the contour of the upper opposite to the edge face of the insole and to the contour of that portion of the upper lying against the rib or shoulder of the insole, means for operating the edge wipers and the shoulder wipers in succession to wipe the upper inwardly over the feather of the insole, and automatic means arranged to force the shoe toward the overwiping faces of the different wipers in the operative movements of the wipers comprising a comparatively light spring arranged to act in the inward movement of the edge wipers and a stronger spring arranged to come into play in the inward movement of the shoulder wipers.

30. In a machine of the class described, toe-lasting means comprising edge wipers and shoulder wipers shaped to conform respectively to the contour of the upper opposite to the edge face of the insole and to the contour of that portion of the upper lying against the rib or shoulder of the insole, means for operating the edge wipers to wipe the upper inwardly over the feather of the insole, means for thereafter wedging the shoulder wipers inwardly between the edge wipers and the shoe to wipe the upper inwardly and shape it against the rib or shoulder of the insole, and automatic means operative in time relation to the different wipers to increase their pressure on the upper in a direction toward the feather of the insole as they are moved inwardly and to relax the pressure between the inward movements of the respective wipers to facilitate forcing the shoulder wipers in between the edge wipers and the shoe.

31. A machine of the class described having, in combination, toe-lasting mechanism, a toe rest, a member movable to clamp a shoe upon said toe rest, operating means for said clamp member constructed to insure that the bottoms of different shoes will be presented in the same relation to the toe-lasting mechanism, and a single power-operated device for moving said clamp member and toe rest as a unit together with the shoe relatively to the toe-lasting mechanism to cause said mechanism to operate upon the shoe.

32. A machine of the class described having, in combination, toe-lasting mechanism, a depressible toe rest, a member movable to clamp a shoe upon said toe rest and to depress the toe rest with the shoe until the bottom of the shoe is presented in a predetermined position, operating means for said clamp member, means for locking the toe rest against further depression by the shoe after the clamping of the shoe, and means for moving said clamp member and toe rest as a unit together with the shoe relatively to the toe-lasting mechanism to cause said mechanism to operate upon the shoe.

33. A machine of the class described having, in combination, toe-lasting mechanism, a shoe support, means for moving said shoe support relatively to the toe-lasting mechanism to cause said mechanism to operate upon the shoe, a member movable to clamp a shoe on the shoe support, and power-operated mechanism carried by the shoe support for operating said clamp member.

34. A machine of the class described having, in combination, toe-lasting mechanism, a shoe support including a depressible toe rest, a member movable to clamp a shoe upon said toe rest and to depress the toe rest with the shoe until the bottom of the shoe is presented in a predetermined position, means for locking the toe rest against further depression by the shoe after the clamping of the shoe, a toggle carried by the shoe support for operating said clamp member, and means for moving the shoe support together with the clamp member and the shoe relatively to the toe-lasting mechanism to cause said mechanism to operate upon the shoe.

35. A machine of the class described having, in combination, toe-lasting mechanism, a shoe support, a member movable to clamp a shoe on said support, a toggle on the shoe support for operating said clamp member, power means for operating said toggle, and power means for moving said shoe support and clamp member as a unit relatively to the toe-lasting mechanism while the toggle is maintained in clamping position by its operating means.

36. A machine of the class described having, in combination, toe-lasting mechanism, a shoe support, a power-operated member for moving said shoe support with the shoe relatively to the toe-lasting mechanism, a positive connection between said member and the shoe support for moving the shoe in one direction to upwipe the upper, and a yielding connection between said member and support for moving the shoe in the opposite direction to increase the pressure of the lasting mechanism on the bottom of the shoe.

37. A machine of the class described having, in combination, toe-lasting mechanism, a shoe support, a power-operated lever for upholding the shoe support and for moving it relatively to the toe-lasting mechanism, and a yielding connection between said lever and the shoe support comprising light and heavy springs arranged to be rendered effective to press the shoe against the toe-lasting mechanism with pressures differing at different times in the lasting operation.

In testimony whereof I have signed my name to this specification.

ARTHUR F. PYM.